United States Patent

Tsukui

[11] Patent Number: 4,503,943
[45] Date of Patent: Mar. 12, 1985

[54] CASTER WITH A STOPPER
[76] Inventor: Motoichi Tsukui, No. 3-6, Nishi-Mizue, Edogawa-ku, Tokyo, Japan
[21] Appl. No.: 446,430
[22] Filed: Dec. 2, 1982
[30] Foreign Application Priority Data
Dec. 5, 1981 [JP] Japan ............ 56-181405[U]
[51] Int. Cl.³ .................................. B60T 1/14
[52] U.S. Cl. .................................. 188/5; 16/34; 188/1.12
[58] Field of Search ........ 188/1.12, 4 R, 5, 7, 188/166, 167; 16/35 R, 34, 19

[56] References Cited
U.S. PATENT DOCUMENTS

| 1,092,506 | 4/1914 | Oldroyd | 16/34 |
| 1,687,631 | 10/1928 | Oberwegnet | 16/34 |
| 2,812,041 | 11/1957 | Mugler | 188/4 R |
| 4,333,207 | 6/1982 | Atwood | 188/1.12 X |

FOREIGN PATENT DOCUMENTS 3020772 12/1981 Fed. Rep. of Germany ..... 16/35 R

Primary Examiner—Bruce H. Stoner, Jr.
Assistant Examiner—Michael P. Gilday

[57] ABSTRACT

A caster to be mounted to a movable object, such as a hoop-shaped walking support for baby, a chair or the like and comprises a basic body turnably mounted at one end and provided at its opposite end with spaced apart axle supports for wheels, a stopper being mounted to the basic body and comprising a bearing portion received between the axle supports, a grounding surface adapted to contact the earth for stoppage of the caster the stopper including, an engaging part for setting the stopper above the lower margin of the wheels, a spring for urging the stopper downward, and a swing limiting projection for limiting the range of the swinging movement of the stopper.

9 Claims, 5 Drawing Figures

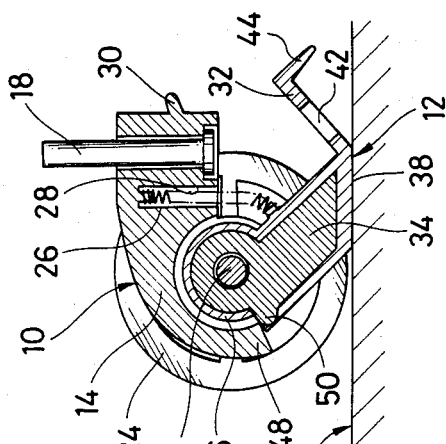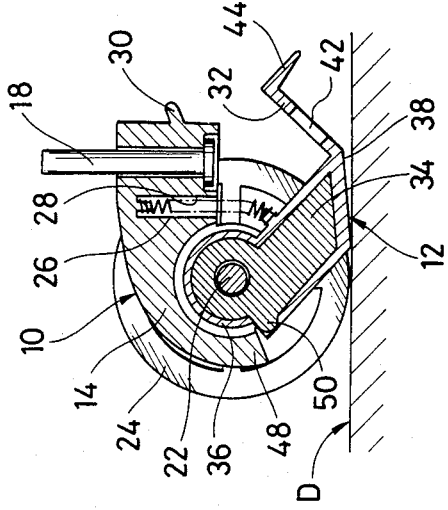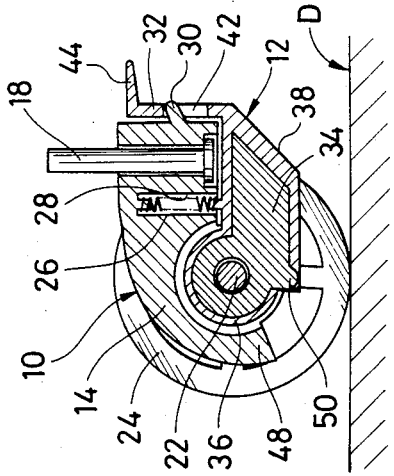

CASTER WITH A STOPPER

BACKGROUND OF THE INVENTION

This invention relates to a caster with a stopper mounted to a movable tool, such as a walking circle for baby, chair or the like. More particularly, the invention relates to a caster for ensuring a reliable stoppage through convenient operation and maintaining a good appearance.

A conventional caster mounted to a movable tool such as a walking circle for baby, a baby car, a chair or the like has a construction in which an operational swivel lever supported on an axle is swung in a given direction to urge a projection of the lever against one of the axle supports in order to discontinue rotation of wheels if desired.

In such construction, however, the wheels are merely fastened between the axle supports and therefore a force for preventing the rotation of wheels is so weak that the caster may not be reliably applied to the walking circle for baby. Instead, a baby has a chance to operate the lever and readily release the stoppage, thereby leading to a dangerous situation.

Upon operation, the axle support on the lever side is forcibly flexed so that its damage may occur upon a long term of usage. Further, the shape of the operational lever and its arrangement on the outer side of the axle support deteriorate an appearance of the moving tool.

Accordingly, a general object of the invention is to provide a caster with a stopper in which the disadvantage described hereinabove may be eliminated and a reliable stoppage may be achieved through convenient operation.

SUMMARY OF THE INVENTION

A principal object of the invention is to provide a caster comprising a basic body turnable at its one end and provided at its opposite end with axle supports spaced apart from each other, and wheels rotatably mounted on either outer side of said axle supports thereby to position the wheels in a direction opposite to the moving direction thereof, the improvement in that the caster is further provided with a stopper which comprises a bearing portion arranged between the axle supports, at least a part of said bearing portion being formed of a strengthening steel material; a grounding surface obliquely provided at an end opposite to said bearing portion, said grounding surface being allowed to contact with the earth through a swing movement of the stopper in the moving direction of the caster; an engaging part provided adjacent to and above the grounding surface for setting the stopper above the lower margin of the wheels; a spring means arranged between the stopper and the basic body for urging the stopper downward upon releasing the engaging part; and a swing stopper adjacent to the bearing portion for limiting a range of the swinging movement of the stopper.

DETAILED DESCRIPTION OF THE INVENTION

In accordance with the invention, the engaging part is preferably provided at its free end with a gripping piece for operating the stopper.

Further, the stopper of the caster according to the invention may be provided with a projection for engaging with the spring between the bearing portion and the engaging part.

The swing stopper is engageable with the basic portion for limiting the movement of the stopper upon contact of the grounding surface with the earth thereby to raise the wheels slightly above the earth.

The invention will be described hereinafter in more detail with reference to the accompanying drawings.

BRIEF DESCRIPTION OF THE DRAWINGS

FIG. 3 is a sectional view of the caster in its movable state with a stopper being in the set position;

FIG. 4 is a sectional view of the caster with the stopper being released from its set position; and FIG. 5 is a sectional view of the caster with the stopper being completely contacted at its grounding surface with the earth for stopping the walking circle.

PREFERRED EMBODIMENTS OF THE INVENTION

Figure 1:
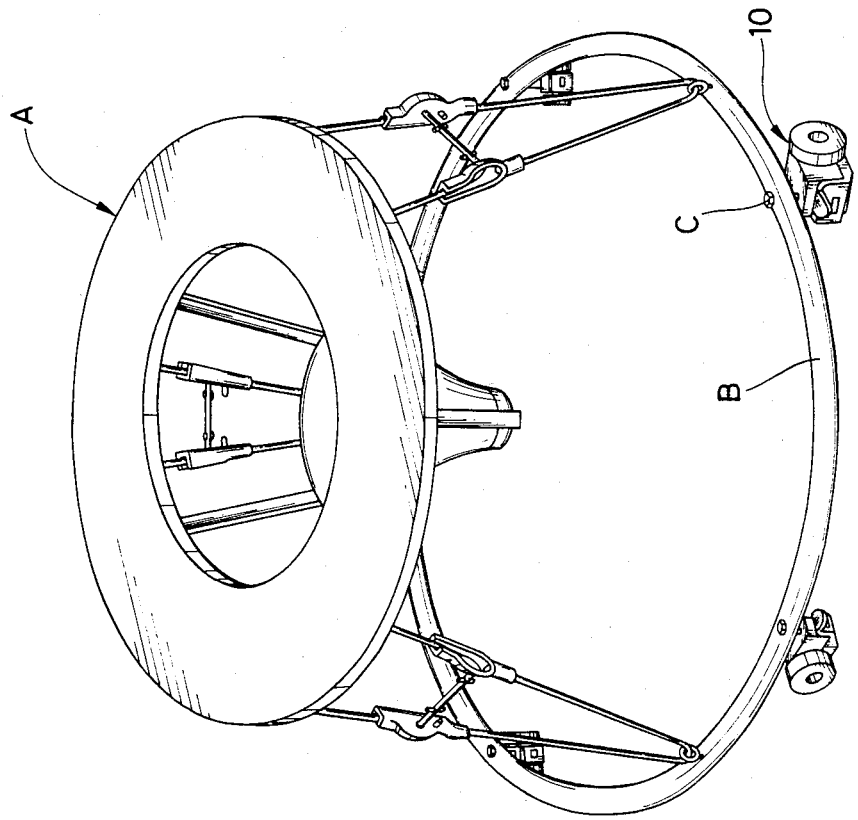
FIG. 1 is a perspective view of a walking circle for baby having casters according to the invention.

A caster 10 according to the invention is provided with a stopper 12 and is turnably mounted to a base ring B of a walking circle for baby A, as shown in FIG. 1.

The caster 10 comprises a basic body 14 of rigid plastics, at one end of which is provided with a vertical hole 16 for inserting therethrough a rod 18 having at its lower end a contacting portion.

A portion of the rod 18 projecting above the hole 16 is mounted to the base ring B with a fixture C thereby to permit the basic body 14 to be freely turned in any direction. The basic body 14 at its lower end opposite to the hole 16 is provided with two axle supports 20 spaced apart from each other for carrying an axle 22, at either outer sides of which are rotatably mounted wheels 24 of rigid plastics. The basic body 14 near its center is provided from the bottom with a recess 28 for receiving one end of a coil spring 26. Further, the basic body 14 at its front face is provided with an engaging protrusion 30 for engaging with the stopper 12.

A major portion of the stopper 12 is made of elastic plastics integrally embedding a strengthening steel material 34 in a predetermined shape and is provided at its front end with an engaging part 32 engageable with the protrusion 30 of the basic body 14. The strengthening material 34 embedded therein makes the stopper 12 (especially, a bearing portion 36 of the stopper) strong and prevents the bearing portion 36 from being damaged by a force applied to the caster 10. The whole stopper 12 may, of course, be made of steel, although the stopper 12 at its grounding surface 38 described hereinafter is preferably roughened or is made of a highly frictional material.

The stopper 12 at its one end is provided with the bearing portion 36 having an axle hole 40 and at its other end with the inclined grounding surface 38, as best shown in FIGS. 3 to 5. In front of the grounding surface 38 extends the engaging part 32 for setting the stopper 12 to the caster 10. The engaging part 32 near its middle is provided with an engaging aperture for receiving the projection 30 of the basic body 14 and at its free end with a gripping piece 44 for conveniently operating the stopper 12. At a middle upper side of the stopper 12 is provided a projection 46 for engaging the other end of the coil spring 26 between the bearing portion 36 and the grounding surface 38. Further, the bearing portion 36 at its bottom is provided with a swing stopper 50 for limiting a range of the swinging movement of the stopper 12. The swing stopper 50 is held against a rear bottom surface 48 of the basic body 14 upon contact of the grounding surface 38 with the earth or a floor D, as best shown in FIG. 5.

Upon assembling the caster 10, the stopper 12 is mounted to the caster 10 in such a way that the grounding surface 38 is directed downward and the bearing portion 36 is positioned between the axle supports 20 and then the axle 22 is inserted through holes of the axle supports 20 and the axle hole 40 of the bearing portion 36.

Before the stopper 12 is mounted to the caster 10, the coil spring 26 has previously been inserted at its one end into the recess 28 of the basic body 14 and engaged at its other end with the projection 46 of the stopper 12. Thus, the spring 26 has a function to urge the stopper 12 downward.

Figure 2:
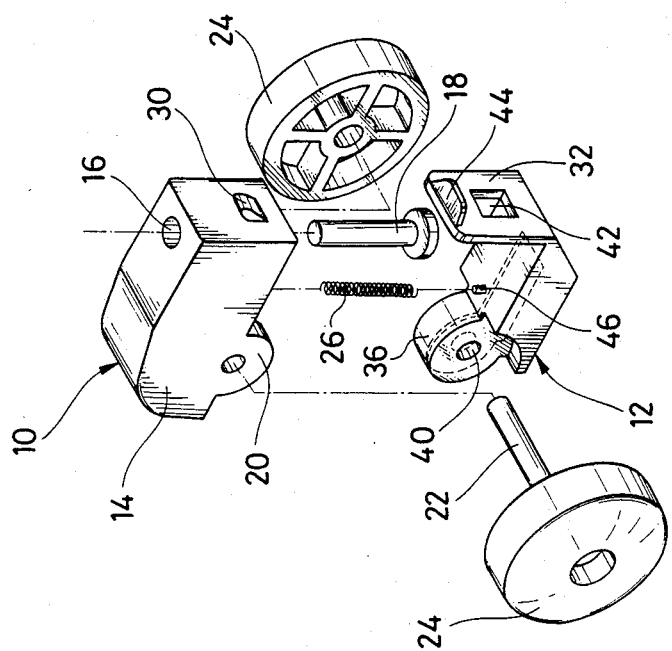
FIG. 2 is a broken perspective view of the caster according to the invention.

The caster 10 according to the invention is assembled with the stopper 12, as shown in FIG. 2 and then a plurality of the assembled casters 10 are mounted to the base ring B of the walking circle A, as shown in FIG. 1. At first, the stopper 12 is swung upward to engage at its engaging part 32 with the projection 30 of the basic body 10 for setting the stopper 12, as shown in FIGS. 1 and 3. In this position, the stopper 12 is located above the lower margin of the wheels 24, so that the caster may be operated similarly to any other conventional casters. The stopper 12 is arranged between the axle supports 20 and therefore does not deteriorates function and appearance of the caster.

Upon operation of the stopper 12, the gripping piece 44 is pulled to release the engaging part 32 from the basic body 14 and to lower the stopper 12 until the grounding surface 38 is contacted with the earth D. In this position, the grounding surface 38 is constantly located nearer to the rod 18 than to the axle 22, so that occasional change of the moving direction of the walking circle A (or the caster 10) does not disturb the stoppage through contact of the grounding surface 38 with the earth D. In this case, the spring 26 enhances not only a force for swinging the stopper 12 downward but also a frictional force of the grounding surface 38 against the earth D, thereby to achieve an important function of the maximal stopping effect on the caster 10.

A further downward swinging movement of the stopper 12 raises the wheels 24 slightly above the earth D to completely discontinue the function of the caster, as best shown in FIG. 5. In this position, the swing stopper 50 is contacted with and held against the rear bottom surface 48 of the basic body 14 to prevent the stopper 12 from further swinging. In the raised position of the wheels, a stronger force applied to the bearing portion 36 is endured by the strengthening material embedded in the stopper 12 as described hereinbefore. However, the grounding surface 38 is located nearer to the rod 18 than to the axle 22, so that the raised position of the wheels is readily relieved thereby to maintain stability of the walking circle A.

In accordance with the invention the novel stopper 12 is incorporated into the caster 10, so that the set position of the stopper 12 (namely, the engaged position of the engaging part 32 of the stopper 12 with the projection 30 of the basic body 14) allows the caster 10 or the walking circle A to freely move in any direction at baby's disposal, while the released position of the stopper 12 (namely, the contacted position of the grounding surface 38 with the earth D) achieves a reliable stoppage of the caster 10.

Although the caster according to the invention has been described hereinabove with reference to the walking circle for baby, it will be appreciated that the caster may be applied to any other movable tools, such as a baby car, a shopping car upon parking on a slope, a chair and others.

In accordance with the invention the stopper 12 is swingable only in the moving direction of the caster 10 and the grounding surface 38 is constantly located nearer to the rod 18 than to the axle 22, so that the stoppage of the caster 10 may be maintained in any condition regardless the moving direction of the moving tool.

Further, the elestic body, such as the coil spring 26 is arranged at the predetermined location, so that it may urge the stopper 12 downward. Thus, during use of the stopper 12, the grounding surface 38 is prevented from being raised from the contacted position with the earth D and the frictional force is increased, so that the very reliable stoppage of the caster 10 may be achieved.

Furthermore, upon complete contact of the grounding surface 38 with the earth D to raise the wheels slightly above the earth D the swing stopper 50 prevents a further swinging movement of the stopper 12, so that the wheels 24 does not work any longer thereby to completely discontinue the operation of the caster 10. Since at least a part of the bearing portion 36 is made to the strengthening steel material 34, the bearing portion 36 is prevented from damage upon the raised position of the wheels, namely on the maximum load. Thus, the movable tool may be firmly and stably supported by the stopper 12.

In the accordance with the invention, the stopper 12 is arranged between the axle supports 20, so that the appearance and the function of the caster or the moving tool are not deteriorated.

As described hereinabove, the caster according to the invention may be mounted to any moving tools, such as a walking circle, a chair and others, and may conveniently and reliably operated to discontinue their movement.

What is claimed is:

1. A caster comprising a basic body turnable at one end thereof and provided at its opposite end with spaced apart axle supports for receiving an axle on which wheels are rotatably mounted on the opposite sides of said axle supports thereby to position the wheels in a direction transverse to the moving direction thereof, a stopper comprising a bearing portion at one end of the stopper and mounted on the axle between the axle supports, at least a part of said bearing portion being formed of a strengthening steel material; an oblique grounding surface provided on said stopper at an end opposite to said bearing portion, said grounding surface being flat for substantial surface contact with the earth on pivotal movement of the bearing portion about the axle, an engaging part forming an extension of the grounding surface for setting the stopper above the lower margin of the wheels; a spring received in a recess in the basic body and being compressed within said recess by the stopper when the stopper is set above the lower margin of the wheels and urging the stopper downward on releasing the engaging part; and a swing limiting means adjacent to the bearing portion for limiting the range of the swinging movement of the stopper about said axle.

2. The caster as claimed in claim 1, wherein the engaging part is provided at its free end with a gripping piece for operating the stopper.

3. A caster as claimed in claim 1, wherein the stopper is provided with a projection for engaging with the spring between the bearing portion and the engaging part.

4. A caster as claimed in claim 2, wherein the stopper is provided with a projection for engaging with the spring between the bearing portion and the engaging portion.

5. A caster as claimed in claim 1, wherein the swing limiting means is engageable with the basic body upon contact of the grounding surface with the earth thereby to raise the wheels slightly above the earth.

6. A caster as claimed in claim 2, wherein the swing limiting means is engageable with the basic body upon contact of the grounding surface with the earth thereby to raise the wheels slightly above the earth.

7. A caster as claimed in claim 3, wherein the swing limiting means is engageable with the basic body upon contact of the grounding surface with the earth thereby to raise the wheels slightly above the earth.

8. A caster as claimed in claim 1, wherein cooperative means are provided one on the basic body and the other on the engaging part and comprising a projection and an aperture, said projection being received in the aperture for locking the stopper in its set position above the lower margin of the wheels.

9. A caster comprising a basic body part turnable at one end thereof and provided at its opposite end with spaced apart axle supports for receiving an axle on which wheels are rotatably mounted on the opposite sides of said axle supports thereby to position the wheels in a direction transverse to the moving direction thereof, a stopper part comprising a bearing portion at one end of the stopper part and mounted on the axle between the axle supports for pivotal movement relative to said basic body part, one of said body and stopper parts having a recess therein and the other part a projection therefrom, at least a part of said bearing portion being formed of a strengthening steel material; an oblique grounding surface provided on said stopper part at an end opposite to said bearing portion, said grounding surface being flat for substantial surface contact with the earth on downward pivotal movement of the bearing portion about the axle, an engaging means forming an extension of the grounding surface for setting the stopper part above the lower margin of the wheels on upward pivotal movement of the bearing portion about the axle; a spring accommodated at an end portion thereof in said recess and its other end by said projection for compressing the spring within the recess when the stopper part is set above the lower margin of the wheels and for urging the stopper part downward and releasing the engaging means; and a swing limiting means adjacent to the bearing portion for limiting the range of the pivotal movement of the stopper part about said axle.

* * * * *